(12) United States Patent
Groves

(10) Patent No.: US 7,383,249 B2
(45) Date of Patent: Jun. 3, 2008

(54) DEVELOPING AND MAINTAINING CUSTOMISED COMPUTER INFORMATION SYSTEMS

(75) Inventor: Glenn John Groves, Harris Park (AU)

(73) Assignee: The Futuren is Freedom Pty Ltd., Harris Park (AU)

( * ) Notice: Subject to any disclaimer, the term of this patent is extended or adjusted under 35 U.S.C. 154(b) by 161 days.

(21) Appl. No.: 10/473,009

(22) PCT Filed: Mar. 18, 2002

(86) PCT No.: PCT/AU02/00285

§ 371 (c)(1),
(2), (4) Date: Mar. 30, 2004

(87) PCT Pub. No.: WO02/077857

PCT Pub. Date: Oct. 3, 2002

(65) Prior Publication Data

US 2004/0153464 A1 Aug. 5, 2004

(30) Foreign Application Priority Data

Mar. 26, 2001 (AU) ................................. PR3994

(51) Int. Cl.
*G06F 7/00* (2006.01)
*G06F 17/30* (2006.01)
*G06F 15/18* (2006.01)
*G06E 1/00* (2006.01)
*G06E 3/00* (2006.01)
*G06G 7/00* (2006.01)
*G06N 3/02* (2006.01)

(52) U.S. Cl. ............................................. 707/3; 706/15
(58) Field of Classification Search ................ 707/100, 707/101, 102, 103, 3; 706/15, 45
See application file for complete search history.

(56) References Cited

U.S. PATENT DOCUMENTS 5,313,629 A * 5/1994 Abraham et al. ........ 707/103 R (Continued)

FOREIGN PATENT DOCUMENTS

GB 2 278 000 11/1994
GB 2278000 A * 11/1994

OTHER PUBLICATIONS

Rahm, Erhard et al., A Survey of Approaches to Automatic Schema Matching, Nov. 2001, The VLDB Journal, 10.*

(Continued)

*Primary Examiner*—Apu Mofiz
*Assistant Examiner*—Brent S Stace
(74) *Attorney, Agent, or Firm*—Steptoe & Johnson LLP

(57) ABSTRACT

In one embodiment, a method or software development tools are provided which allow customised information systems, for example, accounts receivable or stock control software, to be designed, implemented and maintained in less time than is generally presently required, while still providing a customised information system which conforms to the requirements of an industry, individual or an organisation. The invention also provides a customised information system in which the existing development steps of Analysis, Design, and Coding are transformed into a single Definition step.

22 Claims, 5 Drawing Sheets

U.S. PATENT DOCUMENTS

| | | | | |
|---|---|---|---|---|
| 5,442,783 | A * | 8/1995 | Oswald et al. | 707/101 |
| 5,617,514 | A * | 4/1997 | Dolby et al. | 706/45 |
| 5,778,373 | A * | 7/1998 | Levy et al. | 707/100 |
| 5,870,747 | A * | 2/1999 | Sundaresan | 707/101 |
| 5,995,973 | A * | 11/1999 | Daudenarde | 707/103 R |
| 6,374,256 | B1 * | 4/2002 | Ng et al. | 707/103 R |
| 6,665,685 | B1 * | 12/2003 | Bialic | 707/102 |
| 6,823,495 | B1 * | 11/2004 | Vedula et al. | 715/805 |

OTHER PUBLICATIONS

Doan, Anhai, et al., Reconciling Schemas of Disparate Data Sources: A Machine-Learning Approach, May 2001, ACM SIGMOD.*

Huang, Shi-Ming et al., A Data Dictionary System Approach for Database Schema Translation, 1997, IEEE.*

Kappel, G et al., Bottom-up Design of Active Object-Oriented Databases, Apr. 2001, Communications of the ACM, vol. 44.*

Meier, A. et al, "Hierarchical to relational database migration," IEEE Software, vol. 11, No. 3, May 1994, pp. 21-27.

Bancilhon, F., "Object database systems: the ODMG standard," International Federation Information Processing (IFIP) Transactions A (Computer Science and Technology), vol. A-52, 1994, pp. 123-130.

* cited by examiner

Figure 2

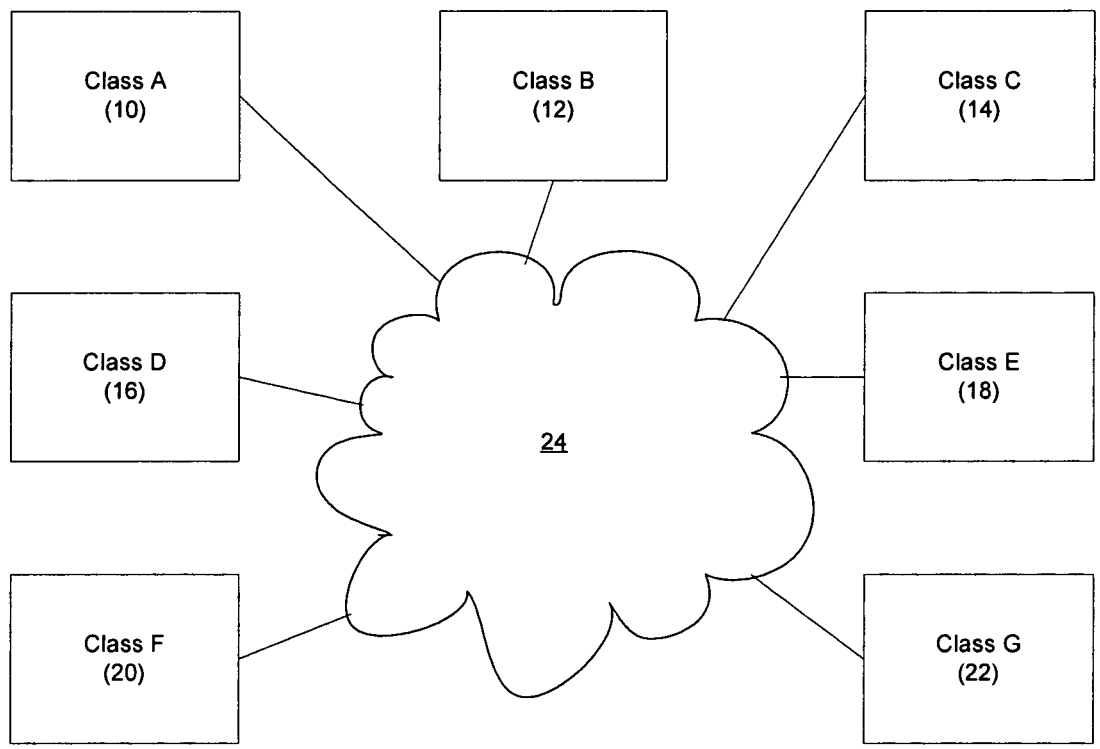

Figure 3

Database,Action,Description,Database
Class,Action,Description,Database,Class,NumberKeyParts
Attribute,Action,Description,Database,Class,Attribute,Type,ErrorMessage
Index,Action,Description,Database,Class,Attribute
Relationship,Action,Description,Database,Class,Attribute,PointerDatabase,PointerClass,
PointerAttribute,Relation
Calculation,Action,Description,Database,Class,Attribute,Calculation
Validation,Action,Description,Database,Class,Attribute,Validation

FIGURE 4

```
Database,Create,Receivables Data,Receivable
Class,Create,,Receivable,State,1
Class,Create,,Receivable,PostCode,1
Class,Create,,Receivable,Customer,1
Class,Create,Order headers,Receivable,Order,1
Class,Create,Order lines,Receivable,OrderLine,2
Class,Create,,Receivable,Product,1
Class,Create,,Receivable,ProductPrice,2
Class,Create,,Receivable,Payment,1
Class,Create,Payment allocations,Receivable,PaymentAllocated,2
Attribute,Create,,Receivable,State,State,CHAR(3)
Attribute,Create,,Receivable,State,Description,CHAR(30)
Attribute,Create,,Receivable,PostCode,PostCode,INT
Attribute,Create,,Receivable,PostCode,State,CHAR(3),Is not a valid State. Must exist in
the State table
Attribute,Create,,Receivable,PostCode,Description,CHAR(30)
Attribute,Create,,Receivable,Customer,Customer,INT
Attribute,Create,,Receivable,Customer,Name,CHAR(30)
Attribute,Create,,Receivable,Customer,AddressOne,CHAR(60)
Attribute,Create,,Receivable,Customer,AddressTwo,CHAR(60)
Attribute,Create,,Receivable,Customer,AddressThree,CHAR(60)
Attribute,Create,,Receivable,Customer,PostCode,INT,Is not a valid Post Code. Must exist
in the Post Code table
Attribute,Create,,Receivable,Customer,State,CHAR(3),Is not a valid State. Must exist in
the State table
Attribute,Create,,Receivable,Customer,Balance,MONEY
Attribute,Create,,Receivable,Order,Order,INT
Attribute,Create,,Receivable,Order,Customer,INT,Is not a valid Customer Number. Must
exist in the Customer table
Attribute,Create,,Receivable,Order,Date,DATE
Attribute,Create,,Receivable,Order,Total,MONEY
Attribute,Create,,Receivable,Order,Paid,MONEY
Attribute,Create,,Receivable,OrderLine,Order,INT,Is not a valid Order. Must exist in the
Order table.
Attribute,Create,,Receivable,OrderLine,Sequence,INT
Attribute,Create,,Receivable,OrderLine,Product,INT
Attribute,Create,,Receivable,OrderLine,Quantity,FLOAT
Attribute,Create,,Receivable,OrderLine,Date,DATE
Attribute,Create,,Receivable,OrderLine,Price,MONEY
Attribute,Create,,Receivable,OrderLine,OldPrice,MONEY
Attribute,Create,,Receivable,OrderLine,Total,MONEY
Attribute,Create,,Receivable,Product,Product,INT
Attribute,Create,,Receivable,Product,Description,CHAR(30)
Attribute,Create,,Receivable,ProductPrice,Product,INT
Attribute,Create,,Receivable,ProductPrice,Date,DATE
Attribute,Create,,Receivable,ProductPrice,Price,MONEY,Price cannot be negative
Attribute,Create,,Receivable,Payment,Payment,MONEY
Attribute,Create,,Receivable,Payment,Customer,INT
Attribute,Create,,Receivable,Payment,Date,DATE
```

FIGURE 4 (Continuation)

```
Attribute,Create,,Receivable,Payment,Total,MONEY
Attribute,Create,,Receivable,Payment,Unallocated,MONEY
Attribute,Create,,Receivable,PaymentAllocated,Payment,MONEY
Attribute,Create,,Receivable,PaymentAllocated,Sequence,INT
Attribute,Create,,Receivable,PaymentAllocated,Order,INT
Attribute,Create,,Receivable,PaymentAllocated,Amount,MONEY
Index,Create,We want to look up Products against Orders
often,Receivable,OrderLine,Product
Relationship,Create,,Receivable,PostCode,State,=,Receivable,State,State
Relationship,Create,,Receivable,Customer,PostCode,=,Receivable,PostCode,PostCode
Relationship,Create,,Receivable,Customer,State,=,Receivable,PostCode,State
Relationship,Create,,Receivable,Order,Customer,=,Receivable,Customer,Customer
Relationship,Create,,Receivable,OrderLine,Order,=,Receivable,Order,Order
Relationship,Create,,Receivable,ProductPrice,Product,=,Receivable,Product,Product
Relationship,Create,,Receivable,OrderLine,Product,=,Receivable,ProductPrice,Product
Relationship,Create,Finds the price relevant to order
date,Receivable,OrderLine,Date,>==,Receivable,ProductPrice,Date
Relationship,Create,,Receivable,Payment,Customer,=,Receivable,Customer,Customer
Relationship,Create,,Receivable,PaymentAllocated,Payment,=,Receivable,Payment,Paym
ent
Relationship,Create,,Receivable,PaymentAllocated,Order,=,Receivable,Order,Order
Calculation,Create,,Receivable,OrderLine,Date,Receivable.Order.Date
Calculation,Create,"Calculates price, but only when the order is first
written",Receivable,OrderLine,Price,IF(OldPrice)THEN(OldPrice)ELSE(Receivable.Prod
uctPrice.Price)
Calculation,Create,,Receivable,OrderLine,OldPrice,Price
Calculation,Create,,Receivable,OrderLine,Total,Quantity * Price
Calculation,Create,,Receivable,Order,Total,Receivable.OrderLine.Total
Calculation,Create,,Receivable,Order,Paid,Receivable.PaymentAllocated.Amount
Calculation,Create,Maintains the customer
balancs,Receivable,Customer,Balance,Receivable.Order.Total - Receivable.Order.Paid -
Receivable.Payment.Unallocated,,,
Calculation,Create,Maintains the unallocated amount of a
payment,Receivable,Payment,Unallocated,Total - Receivable.PaymentAllocated.Amount
Validation,Create,Ensures that price is not negative,Receivable,ProductPrice,Price,>=0
```

DEVELOPING AND MAINTAINING CUSTOMISED COMPUTER INFORMATION SYSTEMS

TECHNICAL FIELD

The present invention relates to computerised information systems, and in particular, to the development and maintenance of customised software providing a customised information system. The present invention also generally relates to improvements on existing methods of designing, developing and maintaining customised information systems.

The present invention generally relates to an improved method of and new computer software for designing, developing and/or maintaining customised information systems.

BACKGROUND ART

Many organisations use computer systems (hereafter referred to as "Information Systems") to record, process and retrieve information. Examples of the kinds of information stored in information systems could include accounts receivable, accounts payable, stock levels, and the like. There are two basic types of information systems available to these organisations. These types can be thought of as "packaged" and "customised".

Packaged types refers to information systems (software) that can be bought, set-up and used immediately. Packaged types work in a manner that is general enough that they can be used by a wide range of organisations without being customised to suit specific organisational requirements.

Customised types refers to information systems (software) that are designed, developed and maintained specifically for an organisation, industry or application, generally to fulfil specific and/or unique requirements within that organisation, industry or application.

For many organisations, industries or applications, custom designed software works or performs better than packaged software. Packaged software is designed to be general, to allow it to be used successfully in a range of organisations, industries or applications. To achieve this, packaged software has to be, so to speak, "A jack of all trades, a master of none". Whilst packaged software will perform many of the fictions that are required, it will usually not perform all, and it will not perform some functions in the best way for the particular use that the packaged software is put.

Organisations, industries or applications which use packaged software often expend time and effort preparing information to be entered into the packaged software (or packaged information system), and manipulating information output by the packaged software, so that the packaged software may be used effectively. Even with this extra ongoing manual effort, some functions may not be managed by the information system at all. Packaged software is presently almost always faster and cheaper to implement than customised software (or customised information systems), which is the primary reason for the existence of packaged software.

Custom designed software (or custom designed information systems) is specifically designed for an industry or an organisation, so the extra manual work required by packaged software is typically not required with a customised information system. A customised information system will generally be developed to do whatever the industry or organization wants, and contain all functionality required, with very little, if any, manual work required in preparing information to be input, or manipulating information that has been output from the customised software to make it useful.

However, customised information systems generally take a relatively long time to implement and maintain, and require highly skilled and specialised personnel to implement and maintain the customised information systems, and therefore are often very expensive and time consuming to implement and maintain.

The extra time and cost to implement a customised information system is often justified by the decreased manual work required by a customised information system, when compared to a packaged information system. For some industries or organisations, there may be no packaged system suitable for them to use, in which case customised systems are the only option.

Although customised information systems can fit an industry or organisation's requirements exactly, because of the time taken to develop and maintain a customised information system, customised information systems usually do not fit what is required today—they generally fit what was required a few months or a few years ago. By the time the customised information system has been fully implemented or modified to fit the current needs of an industry or organisation, those needs are often no longer the current needs—the requirements have changed.

For this reason, although customised information systems will fit an industry or an organisation better than packaged information systems, they do not fit perfectly, and are usually expensive. This time delay in developing a customised information system, and the high expense of customised information systems, means that many organisations simply cannot afford a customised information system, and thus use a packaged information system, with the inherent disadvantages involved in using a packaged information system, or do not use a computerised information system at all.

Presently, when developing a customised information system, there is a standard method that is followed. The various steps within the method may vary, but generally they include the following steps:

1. Analysis (Work out what the information system needs to do)
2. Design (Work out how the information system should do it)
3. Coding (Make the information system do it)
4. Testing (Test that the results of the Coding step fit the results of the Design step and the results of the Analysis step, and that the industry or organisation for which the information system is being developed is satisfied that the information system will fulfil requirements)
5. Implementation (Render the information system up and running and able to be used by the industry or organisation, including loading any data required)

Most of these steps require not only intensive work, but also require thorough documentation of the results of that work. There is a danger that the analysis results of the first step will be misunderstood, displaced or corrupted when designing the information system, or that the design will be misunderstood, displaced or corrupted when coding or testing the information system. Thorough documentation is required to prevent these mistakes from occurring. Therefore, the presently known method not only requires the time taken to carry out each step of the method, but also requires time to be taken simply to ensure that the results of one step are carried successfully through to the next step.

For larger or complex customised information systems, the information system will often be broken into components, and then into sub-components, and the five step method will be carried out for each subcomponent. The results of the method for the previous component or subcomponent are then built on when developing the next component or subcomponent. This is useful to ensure that the information system being developed or maintained conforms to requirements, but consumes time and increases the cost of the information system.

An information system consists of one or more databases, which in turn consist of a number of classes (in some systems called tables or files) which are related to each other. Each class contains instances which share the same possible list of attributes, but may contain different values against each of those attributes. Instances within classes can be related to instances within other classes. Classes within presently known systems tend to be related in a hierarchical manner. That is, some classes are clearly subservient to some other classes. This structure is illustrated in FIG. 1 (prior art).

The relationships between these classes are defined (duplicated or replicated) in every program that needs to derive data that is related to other data. That is, if a program needs to find all instances in class A (10) that are related to a given instance(s) in class B (12), that program must understand how the data in class A (10) is related to the data in class B (12). This makes programs longer and more difficult to write and to maintain, and means that it takes a relatively long time to implement and to maintain the programs, and requires highly skilled and specialised personnel to do so. This also means that programs must be changed when the relationships between classes changes. Programs that require this understanding include programs that validate data, that derive data, and that are used for searching or "drilling". As illustrated in FIG. 1, class A (10) is also directly related to class C (14). Class D (16), class E (18), class F (20) and class G (22) are each related to class A (10) via class B (12).

For example, if a program needed to retrieve the values of the attribute "Amount" from the class "Invoice", it could look like the following:
Variable=0
SELECT Invoice Class WHERE CustomerAttribute="00001"
FOR Each InvoiceInstance Selected
   GET Each InvoiceInstance
   Variable+=InvoiceInstance.Amount Most programs require recursion or looping—that is, repeating a series of instructions a number of times. This makes writing and maintaining these programs more difficult, more time consuming, more costly, and requires a high level of knowledge and skill. Most programs also require branching—the ability to choose which series of instructions within the program should be followed.

For example, if a program needed to retrieve the values of either the attribute "Amount" or the attribute "DiscountAmount", depending on whether the customer received a discount or not, from the class "Invoice", it could look like the following:
Variable=0
GET CustomerInstance FROM Customer Class FOR Customer "00001"
SELECT Invoice Class WHERE Customer Attribute="00001"
FOR Each InvoiceInstance Selected
   GET Each InvoiceInstance
   IF CustomerInstance.DiscountFlag='Y' THEN
     Variable+=InvoiceInstance.DiscountAmount
   ELSE
     Variable+=InvoiceInstance.Amount Programs are written to perform complicated validation, and to perform derivation Validation refers to ensuring that the data is correct. Derivation refers to calculating new data from other data. If programs are poorly written, the data will not be validated correctly, and derived data may not be calculated correctly. Programs should also be written to take into account that an update in one class may require updates in other classes, which may require updates in other classes, etc. Any failure for the programs to take this into account can result in the data that is stored within the system being inaccurate.

For example, if a program needed to validate that a particular customer was entitled to purchase a given product, it could look like the following. This example could be of a wholesaler which sells any quantity of any products to a retailer, but only sells a limited range of products to private individuals:
GET CustomerInstance FROM Customer Class FOR Customer "00001"
IF CustomerInstance.Type='Private' THEN
   GET ProductInstance FROM Product Class FOR SaleInstance.Product
   IF ProductInstance.CustomerType NE 'Private' THEN
     Error As a further example, if a program needed to update a customer's balance whenever a new sale occurred, and whenever a payment was received, it could look like the following:
GET CustomerInstance FROM Customer Class FOR SaleInstance.CustomerNumber
CustomerInstance.Balance+=SaleInstanceAmount
PUT CustomerInstance ON Customer Class FOR SaleInstance.CustomerNumber
GET CustomerInstance FROM Customer Class FOR ReceivedInstance.CustomerNumber
CustomerInstance.Balance-=ReceivedInstanceAmount
PUT CustomerInstance ON Customer Class FOR Received Instance.CustomerNumber This identifies a need for an unproved method of and new computer software for designing, developing and/or maintaining customised information systems which overcomes or at least ameliorates the problems inherent in the prior art as discussed previously.

This also identifies a need to provide a means for classes within an information system not to be required to be solely related in a hierarchical manner. That is, although classes can be clearly subservient to some other classes, classes do not necessarily have to be related in a hierarchical manner as in the prior art. There is a need for classes to be able to be related in a more flexible manner.

Definitions

Access to an information system is provided by terminals which are capable of requesting and receiving information from local or remote information sources. A terminal may be any type of computer or computerised device, a personal computer (PC), a mobile or cellular phone, a mobile data terminal, a portable computer, a personal digital assistant (PDA), a pager, a thin client, or any other similar type of electronic device. The capability of the terminal to request and/or receive information can be provided by an application program which may or may not be part of the information system, hardware or other such entity. A terminal may be provided with associated devices, for example an information storage device such as a hard disk drive.

An information source may be a server or any other type of terminal (for example, a PC computer) coupled to an information storage device (for example, a hard disk drive). The exchange of information (i.e., the request and/or receipt of information) between the terminal and the information source, or other terminal(s), is facilitated by a communication channel. The communication channel may be physically realised via a metallic cable (for example, a telephone line), semiconducting cable, an electromagnetic signal (for example, a radio frequency (RF) signal), an optical fibre cable, a microwave link, a satellite link or any other such medium or combination thereof connected to a network infrastructure.

The terms 'data' and 'information' are used within this document to assist in describing the scope of the present invention. For the purposes of describing and defining the present invention, the terms are taken to be interpreted as:

Data—The separate components which make up information. Individually, the components are not generally useful; an industry or organisation cannot use the data to determine the best action to take. As an analogy, data could be thought of as the bricks, mortar, wood and nails of a house. Separately, they are of no use; but when they are put together to form a house, they perform a useful purpose. An example of data might be a customer number, an amount of money, and a date. There is generally no useful action that can be taken with these the separate pieces of data.

Information—Data that has been put together in such a way as to be useful. To continue the analogy, a house can be thought of as bricks, mortar, wood and nails that have been put together in such a way as to be useful. An example of information might be a customer number, with a related amount of money due, with a related date due that is three months in the past. This is the same data used in the previous definition of data, but because the data has been put together in the right way, an organisation can now take appropriate action based on selected criteria. The appropriate action could be, for example, to refer a debt to a debt collector, or just call a customer and speak with them about a debt.

Generic object oriented terminology is used in this specification, but not exclusively. The following definitions are used to clarify terms in this specification.

Instance—Could also be called a record within a file, or a row within a table. An instance is a see, distinct item, stored among items of a similar type, within the system. For example, all orders are likely to be stored within the same class. Each separate order is an instance within that class.

Class—Could also be called a file or a table. All information of a particular type is stored in a particular class. For example, all orders are likely to be stored within one class, and all customer information is likely to be stored within another class.

Attribute—Could also be called fields on a file, or columns on a table. Every separate piece of data is stored as an attribute. For example, an order class is likely to contain the following attributes: Order number, customer number, date, amount, delivery instructions, and so on. A customer class is likely to contain the following attributes: Customer number, name, address, phone number, fax number, credit limit, and so on.

Relationship Category—Refers to how data can be related to other data. Many different relationship types can fit within the one relationship category. Basically, data can be related to other data by being Not Equal (NE), Greater Than (GT), Greater than or Equal (GE), Equal (EQ), Less than or Equal (LE) or Less Than (LT) the other data. Relationship category is one of the two phrases used within this specification to describe the relationships between data. Relationship Type is the other phrase.

Relationship Type—Further defines, or narrows down, how data can be related to other data. Every relationship type fits within a relationship category. There are two basic reasons for there being multiple relationship types within one relationship category. 1. The first is that it is possible to define that a piece of data is related to one specific other piece of data, by defining that it is the first or last piece of other data to which it is related. For example, the relationship type <==(Less than or Equal Equal) belongs to relationship category LE, but refers to the one piece of other data that is less than or equal to the data, and is most equal. If there are multiple pieces of other data, the piece most equal to the data will be chosen. 2. Relationship types can be written in multiple ways, eg <# is equivalent to < and #<, yet they all belong to the same relationship category.

Program—Any series of instructions telling a computer what to do, and what order to do it in. Generally called a Method in Object Oriented terminology. Could also be called an applet, subroutine, module, script, batch, or function. There are other possible names also, not included here.

DISCLOSURE OF INVENTION

The present invention seeks to enable customised information systems to be designed, developed and/or maintained in less time than presently required by existing methods or software tools for developing customised information systems. The present invention combines neural networking theory with database design to achieve this.

In a preferred embodiment, the present invention seeks to provide software development tools which allow customised information systems (or software) to be designed, implemented and maintained in less time than is generally presently required, whilst still providing a customised information system which conforms to the requirements of an industry, individual or an organisation. The present invention also seeks to provide a customised information system which is more affordable. The present invention also seeks to provide a customised information system in which the existing development steps of Analysis, Design, and Coding are transformed into a single Definition step.

In a particular embodiment of the present invention there is provided a method of developing a customised information system, the method including the steps of:

Definition;
Testing; and
Implementation;

whereby, the definition step is used to define information which an industry or organisation requires in the customised information system by specifying how data used by the customised information system is related to other data used by the customised information system, in accordance with a relationship category, the specified relationship categories between the data being stored in at least one database accessible by the customised information system.

In another particular embodiment of the present invention there is provided a method of converting between data and information within customised computer software, the method including:

defining a relationship between each component of data which is entered into the customised information system, without a developer of the customized information system having to separately write computer program code to define such relationships; and constructing information, the information being a grouping of selected components of the data, in accordance with the defined relationship between the selected data; and if required deconstructing information, the information being a grouping of selected components of the data, the decons information providing data with or without defined relationships.

In yet another particular embodiment of the present invention there is provided a software development tool for developing a customised information system, the customised information system including instance, class, and attribute features, the software development tool able to perform a Spread of Activation function on at least one first instance in a given first class, thereby activating at least one second instance in at least one second class, the at least one first class having a defined relationship to the at least one second class. In one form, the defined relationship is a relationship category or a relationship type. Spread of Activation is further defined below.

In yet another particular embodiment of the present invention there is provided a computer-readable medium of instructions for developing a customised information system, the computer-readable medium of instructions including procedures to define relationship categories in the customised information system by specifying how each is piece of data used by the customised information system is related to each other piece of data used by the customised information system, thereby facilitating the customised information system to carry out all necessary data conversion required to conform any piece of information or data, used by the customised information system, to the defined relational requirements.

In yet another particular embodiment of the present invention there is provided a customised computer software system, utilising object oriented technology, in which relationships between data used in the customised computer software system are defined and the relationship definitions stored in a database for use by the customised computer software system, the relationship definitions not being reproduced in the main program code of the customised computer software system.

The following sub-headings outline features of preferred aspects of a form of the invention:

Spread of Activation

Spread of Activation could also be described as a "drill" or a "drill down". A Spread of Activation begins with one or more instances in a given class being activated (which means being temporarily marked in some way), and spreads to all instances in other classes that are related to those instances, according to the relationships defined between those classes. A spread of activation occurs recursively; that is, an activation can occur from class A (10) to class B (12), then using the results of that activation another Spread of Activation can occur from class B (12) to class D (16), etc, until the required related class has been activated. For example, to determine which customers had bought cars from a particular manufacturer, that manufacturer would be activated in, for example, the Manufacturer class, then a Spread of Activation is performed to, for example, the Car class, then a spread of activation is performed to, for example, the Sale class, and then a spread of activation is performed to, for example, the Customer class. All customers who had bought cars from that manufacture would now be activated in the Customer class.

Retrieve

One of the functions of a program is to retrieve the values of attributes, of appropriate instances, within appropriate classes. Using prior art techniques, if given one or more instances in a first class, to retrieve the values of given attributes of all related instances in a second class, a program would need to understand how the classes are related. A program would have to be written with the relationships encoded inside the program.

In accordance with the present invention, any program, if given one or more instances in any one class, can use the "Spread of Activation" function/process defined above to locate all related instances in another class. The program can then retrieve the summed or concatenated values of given attributes of related instances in that second class, without the program itself containing the relationships between the classes. This occurs irrelevant of the number of steps required in the Spread of Activation between the two classes. The program does not need to encode how the classes are related.

Calculation

A one-line program, in the general form of a mathematical formula, that may allow branching but does not allow repetition. A calculation is a specific form of the kind of program referred to in the preceding "Retrieve" subheading. Repetition is not required, as it is made redundant via the use of the Retrieve and Spread of Activation functions/processes described above.

Derivation

Derivation uses a "Calculation" as described in the preceding sub-heading, attached to a particular attribute in a particular class. Each time an instance is to be updated into the class, the calculation is performed/evaluated, according to the preceding description, and the value of that attribute for that instance is set to the result of the calculation. The instance being updated is considered to be the "given" instance for the purposes of the Spread of Activation.

Validation

Validation uses a calculation as described hereinbefore, attached to a particular attribute in a particular class. Each time an instance is to be updated into the class, the calculation is performed/evaluated, according to the preceding description, and if the result of the calculation has a particular value, for example 0, or falls within a particular range of values, the attribute has failed Validation. If one or more attributes fail Validation, the instance has failed Validation, and may not be written into the class. The instance being updated is considered to be the "given" instance for the purposes of the Spread of Activation.

Data Integrity

Whenever an instance in a class is updated, the system can check whether any calculations anywhere in the system reference the class that was just updated. If there are calculations that reference the class that was updated, the system automatically carries out a Spread of Activation from the instance that was updated, to the classes that contain those calculations. All instances that were activated in the class which contains the calculations are then recalculated, and revalidated, and any changed instances are updated—if the instances have passed Validation. If the instances did not pass Validation, an error message can be produced. Depending on implementation of this embodiment of the invention, this may cause the first instance that was being updated, not to be updated. Every update of an instance begins this process, regardless of what caused the update. This should guarantee data integrity, and remove the requirement for much of the programming that is required in prior art techniques.

Drill Down

Drill Down is the ability to find and report all instances in a given class which are related to given instances in another class, and is related specifically to some kind of search. A search would be carried out that activated instances in a given class, and then a Spread of Activation would be carried out until the class that was being drilled to was activated. The instances that were activated in the class being Drilled to are the results of the Drill. (The preceding example of determining which customers had bought cars from a particular manufacturer under Spread of Activation is an example of Drill Down. According to the present invention, this is achieved by the Spread of Activation function/process previously described, and therefore the relationships only need to be defined once, with all of the inherent advantages of only defining relationships once.)

In one form of the present invention, an information system is provided which allows classes to be able to be related in a flexible manner. FIG. 2 provides an illustration of an example of how database relationships (24) could be structured according to an embodiment of the present invention. The relationships (24) between these classes (10), (12), (14), (16), (18), (20) and (22) need only be defined in one place. Programs that need to derive data that is related to other data, do not understand how the data is related. That is, if a program needs to find all instances in class A (10) that are related to a given instance(s) in class B (12), the program can derive the list of all related instances without knowing how they are related. This makes programs much shorter and easier to write and maintain. This also means that programs do not need to be altered when the relationship between classes changes. Programs that no longer require the understanding of how classes are related include programs that validate data, that derive data, and that are used for searching or "drilling".

The following examples should not be construed as limiting to the present invention, but are provided so that the reader can contrast these examples, formed in accordance with an embodiment of the present invention, with the aforementioned prior art examples.

For example, if a program needed to retrieve the values of the attribute "Amount" from the class "Invoice", it would only need to use code similar to the following:

Variable=Invoice.Amount

Most programs are replaced with calculations. A calculation is a program that does not contain recursion or looping, but can still contain branching. Because recursion and looping is not used, programs are much shorter and easier to write and to maintain, and require a lower level of knowledge and skill to create and maintain. Because calculations do not contain relationship rules, and they do not contain recursion or looping, most calculations may only be one line. In some cases, there could be extra attributes on some classes to allow the system to work correctly without requiring recursion or looping. Whenever a calculation in one class references an attribute in another class, all values for that attribute in related instances are summed or concatenated together. The attribute reference in the calculation is replaced by the summed or concatenated result in the calculation.

For example, if a program needed to retrieve the values of either the attribute "Amount" or the attribute "DiscountAmount", depending on whether the customer received a discount or not, from the class "Invoice", it could look like the following:

Variable=IF Customer.DiscountFlag="Y" THEN Invoice.DiscountAmount ELSE

Invoice.Amount

Calculations can be used to perform validation and derivation. Every attribute on every class can have no calculations, or either a derivation or a validation calculation, or both a derivation and a validation calculation. Every instance will have been fully validated and derived before being written into the class. That is, all validation calculations would have been passed, and all derivation calculations would have been carried out and the values of the attributes set accordingly. Also, when any instance is updated anywhere in the database, and that update alters the values returned from any derived calculations anywhere in the database, the calculations can be automatically recalculated, the effected instances can be automatically updated, and the updated instances can be automatically written into the class. This may begin another circle of automatic updates. In a particular embodiment of the present invention, if a validation calculation returns a 0 or null (" ") result, the validation has failed, and if it returns a non zero and non null result, the validation has passed.

For example, if it was necessary to validate that a particular customer was entitled to purchase a given product, the Product attribute on the Sale class could have the following Validation calculation. This example could be of a wholesaler which sells any quantity of any products to a retailer, but only sells a limited range of products to individuals:

Customer.Type NE 'Private' OR Product.CustomerType='Private'

As a further example, if it was necessary to update a customer's balance whenever a new sale occurred, and whenever a payment was received, the Balance attribute on the Customer class could have the following Derivation calculation:

Sale.Amount−Received.Amount

Accordingly, the present invention seeks to provide these and other features providing an improved method of or new computer software for designing, developing and/or maintaining customised information systems.

BRIEF DESCRIPTION OF FIGURES

The present invention will become apparent from the following description, which is given by way of example only, of a preferred but nonlimiting embodiment thereof, described in connection with the accompanying figures, wherein:

FIG. 2 illustrates possible database relationships according to the present invention;

FIG. 3 illustrates an embodiment of the present invention wherein, the figure shows a data definition format;

FIG. 4 illustrates an example of a more detailed data definition format; and

MODES FOR CARRYING OUT THE INVENTION

Figure 1:
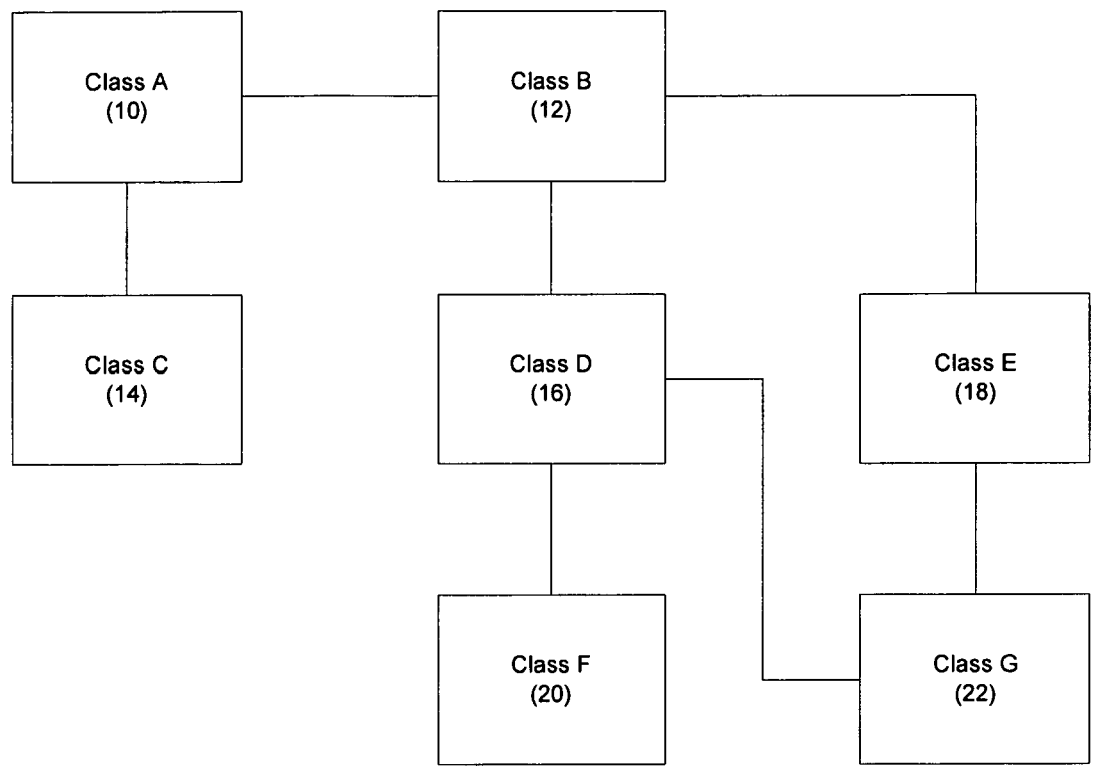
FIG. 1 illustrates prior art database relationships.

The present invention provides an improved method of and new computer software for designing, developing and/or maintaining customised information systems.

I. Preferred Embodiment

In one preferred embodiment of the present invention, the present invention alters the basic five step method by which a customised information system is presently created. Instead of the basic five step method discussed previously, the present invention requires the use of only three steps to provide a method by which a customised information system may be developed. These three steps, with a brief description of each step, are:
1. Definition (Define the information that the industry or organisation uses; in the format of FIG. 3, Data Definition Format, and process that information through the procedure InfoBase.Create)
2. Testing (Confirm that the industry or organisation for which the information system is being developed is satisfied that the resulting information system can fulfil their requirements)
3. Implementation (Render the information system up and running and able t be used by the industry or organisation, including loading any data required)

The first three steps of the existing five step method are transformed into one step according to an embodiment of the present invention. This eliminates most of the requirement for documentation that presently exists with the existing five step method, and allows customised information systems to be developed and maintained in less time and at less expense than the existing five step method.

The first step required in the method of the present invention is simpler than the first three steps of the prior art method. Most of the analysis, design and coding steps required in the existing five step method are either not required, or are carried out by a computer readable medium of instructions, for example software, which is disclosed as a further embodiment of the present invention, without requiring human time or effort This further significantly decreases the time required to develop and maintain a customised information system, and further decreases the cost of a customised information system to an industry or organisation.

All information systems have two basic functions. The first is to take information in, convert it into the raw data that the information consists of, and then store that raw data in an electronic database (or information source). The second is to extract that raw data, reform the raw data into one or more kinds of information, and output that information.

Existing methods or software tools for developing information systems require the process of converting from information to raw data, or from raw data to information, largely defined by persons. Persons develop a series of computer commands that a computer then stores and executes to perform this conversion between raw data and information. These series of commands are sometimes called programs, modules, scripts, or applets, but there are also many other terms for these series of commands.

Information systems have been developed to do away with the need for some of these series of commands, but with existing information systems, these series of commands still need to be cod for some parts of the information system, if not for all parts.

The present invention provides a means for developing information systems which does not require human interaction to develop any of these series of commands. In accordance with the present invention, a person (or user) specifies how each of the pieces of data are related to each other piece of data so as to form information. The present invention then provides a means which carries out all conversions required to conform components of the information system to these relational requirements.

To further explain this concept, exising information systems require a person to add business logic specific to an organisation to the information system by developing programs of some sort. The present invention does not require the development of such programs. The term "information base" or "infobase" may be used to describe an embodiment of the present invention working with one or more databases to convert information to data, and data to information.

According to a specific embodiment of the present invention, the present invention can be described as an intelligent software tool, that understands how all data is related to all other data, and maintains all data in accordance with those rules. For example, if a customer order was written into a database, the software tool can maintain the customer balance and stock levels in accordance with the new order; as long as the software tool was informed that customer orders were related to customer balances, and stock levels, and how they are related. No additional programming when developing an information system is required to achieve this.

A further embodiment of the present invention also provides means which allow all data is in all attributes in all classes in all databases to be searched easily and flexibly. All data related in any way to the data found as a result of the search can also be retrieved easily and flexibly. "Drill down" is supported on every attribute in every class in every database. This is referred to within this document as "searches" or "selections". "Drill down" refers to the ability to easily retrieve data that is related to particular other data.

Prior art techniques require custom written programs or other form of computer instructions at two times; when data is being updated into the system; and when data is being retrieved from the system. The present invention does not require custom written programs at either of these times. An example of the processing carried out by programs in the prior art could be updating a customer order into a system, and retrieving a customer order history from a system. At the time of updating the customer order into the system, the stock levels may be calculated and updated by a custom written program. At the time of retrieving a customer's order history, the total value of all orders may be calculated by another custom written program. The present invention enables all data that may be required to be calculated and stored in the database without using any custom written programs to achieve this. In this example, both the stock levels and the total value of a customer's orders could be calculated and updated at the time an order is updated into the system, based solely on the defined relationships between the data, therefore not requiring custom written programs.

The present invention is not limited to any particular means of receiving information from a user, another system, etc, or of rendering information to a user, another system, etc. Any means of entering data into a particular computer system, or outputting data from a particular computer system, may be used with the present invention.

In accordance with a further, but non-limiting, embodiment of the present invention, a computer readable medium of instructions is provided as a software tool. This software tool can be implemented using the following data definition, data structures and procedures. All classes (data structures) that have control in the software tool are called control classes, and can be stored within one database.

Data Definition

Data definitions are most easily created in a spreadsheet package, and then saved as comma delimited. The comma delimited file that is output is displayed in FIG. 3. An example data definition, that defines a simple Accounts Receivable information system, is shown in FIG. 4. Data definitions could also be created and maintained using other means, for example a graphical input and maintenance device.

Data Structures

Figure 5:
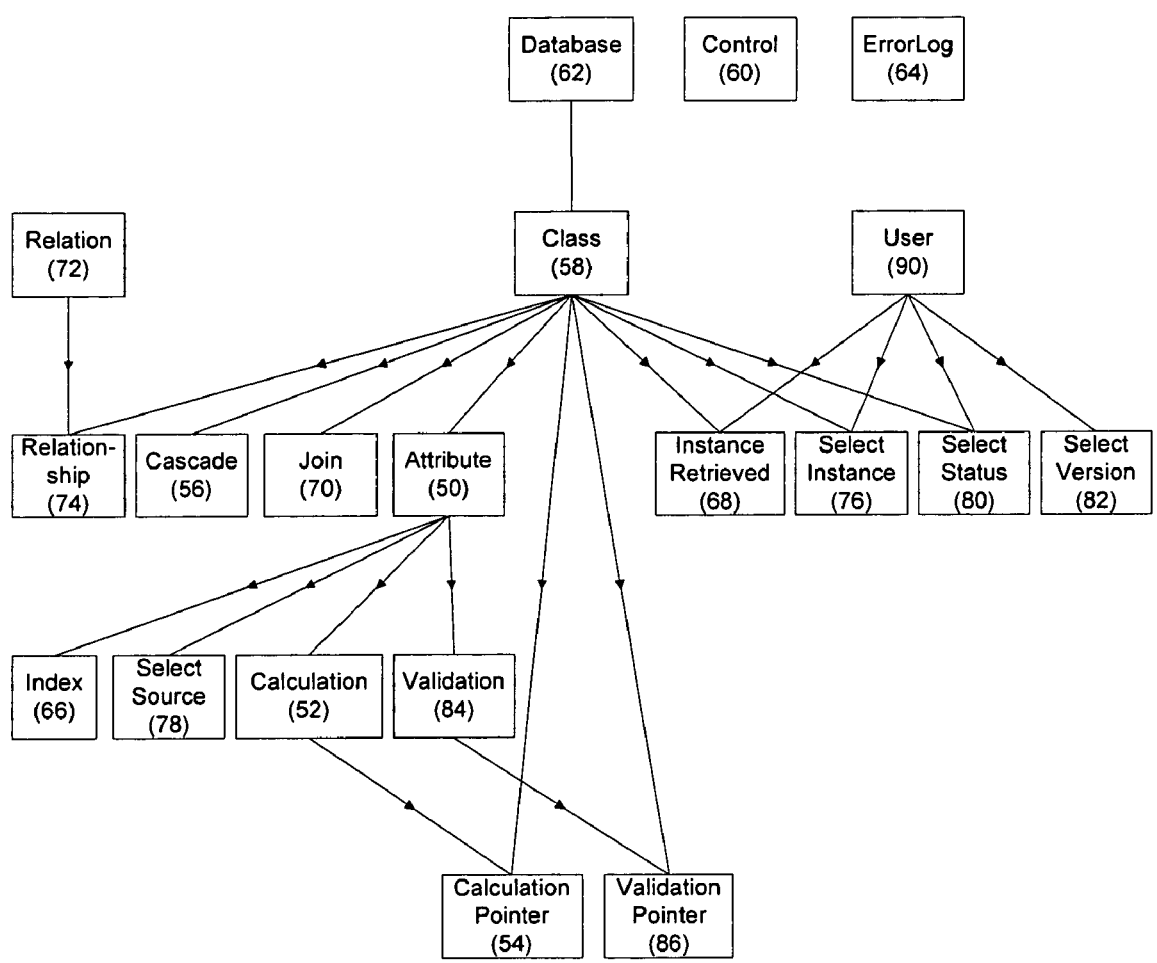
FIG. 5 illustrates an embodiment of the present invention wherein, the figure shows a control class structure showing the relationships between the classes within the control structure.

The data structures in brief include, referring to FIG. 5:

1. Attribute (50) (Definition of all attributes in all classes in all databases.)
2. Calculation (52) (Definition of all calculations related to all attributes.)
3. CalculationPointer (54) (Calculations can contain references to attributes. To speed up recalculating a calculated attribute when the referenced attributes change, this class is used as an index to the calculation class.)
4. Cascade (56) (Cascade is the term used to describe the process involved in all second level updates. When any cascade occurs, all details required to carry out that cascade are written into this class. The Cascade.Modify procedure processes the instances in this class.)
5. Class (58) (Definition of all classes in all databases.)
6. Control (60) (General control entries; such as Cascade enable/disable.)
7. Database (62) (Definition of all databases)
8. ErrorLog (64) (Any errors that occur with control classes or procedures are written into this table.)
9. Index (66) (Definition of all indexed attributes)
10. InstanceRetrieved (68) (Records when an instance was most recently retrieved by each user. Each instance in the database contains a field that defines when that instance was most recently updated. Whenever Instance.Update is about to update an instance, it checks that the user (90) retrieved the instance since the most recent update of that instance. This ensures that one user's changes are not overwritten accidentally by another user.)
11. Join (70) (This class defines how every class is related to every other class. It is used when extending a search, when calculating attributes, and when validating instances.)
12. Relation (72) (Defines all relations that are valid for select commands, and relationships)
13. Relationship (74) (Defines how each class is related to neighbouring classes.)
14. SelectInstance (76) (Contains a list of all selected instances for all database, class and user combinations. Also contains a select version number. This number is used to determine which instances are currently selected, and which ones were selected but are not selected currently.)
15. SelectSource (78) (Records how often a particular attribute has been used in a select search. Can be used to determine where indexes could be added to speed up the system.)
16. SelectStatus (80) (Contains a list of all selected classes for each user. Also contains a select version number.)
17. SelectVersion (82) (Defines the current select version number for each user (90). Any entries in the SelectInstance and SelectStatus files with the same select version number are current selects.)
18. Validation (84) (Definition of all validations related to all attributes.)
19. ValidationPointer (86) (Validations can contain references to attributes. To speed up revalidating all related instances when an instance is added, updated or deleted, this class is used as an index to the Validation class.)

Data Structure Details

The data structures are given in more detail hereinafter. Those attributes marked with an asterisk (*) combine to form a unique key to each instance within the class. FIG. 5 illustrates Control Class Structures, which graphically represent how the various control classes are related to one another:

| 1. Attribute Class Data Structure | |
|---|---|
| Attribute | Type |
| Database* | CHAR[30] |
| Class* | CHAR[30] |
| Attribute* | CHAR[30] |
| Type | CHAR[10] |
| Position | LONGINT |
| Description | CHAR[300] |
| ErrorMessage | CHAR[300] |

| 2. Calculation Class Data Structure | |
|---|---|
| Attribute | Type |
| Database* | CHAR[30] |
| Class* | CHAR[30] |
| Attribute* | CHAR[30] |
| Description | CHAR[300] |
| Calculation | CHAR[3000] |

| 3. CalculationPointer Class Data Structure | |
|---|---|
| Attribute | Type |
| Database* | CHAR[30] |
| Class* | CHAR[30] |
| Attribute* | CHAR[30] |
| Occurrence* | LONGINT |
| PointerDatabase | CHAR[30] |
| PointerClass | CHAR[30] |
| PointerAttribute | CHAR[30] |

| 4. Cascade Class Data Structure | |
|---|---|
| Attribute | Type |
| User* | CHAR[30] |
| Date* | DATE |
| Time* | TIME |
| Database | CHAR[30] |
| Class | CHAR[30] |
| NewInstance | CHAR[3000] |
| OldInstance | CHAR[3000] |
| ErrorMessage | CHAR[3000] |

5. Class Class Data Structure

| Attribute | Type |
|---|---|
| Database* | CHAR[30] |
| Class* | CHAR[30] |
| NumberKeyParts | LONGINT |
| NumberAttributes | LONGINT |
| Description | CHAR[300] |

6. Control Class Data Structure

| Attribute | Type |
|---|---|
| Name* | CHAR[30] |
| ControlData | CHAR[3000] |

7. Database Class Data Structure

| Attribute | Type |
|---|---|
| Database* | CHAR[30] |
| Description | CHAR[300] |

8. ErrorLog Class Data Structure

| Attribute | Type |
|---|---|
| UserName* | CHAR[30] |
| Date* | DATE |
| Time* | TIME |
| ErrorData | CHAR[3000] |

9. Index Class Data Structure

| Attribute | Type |
|---|---|
| Database* | CHAR[30] |
| Class* | CHAR[30] |
| Attribute* | CHAR[30] |
| Description | CHAR[300] |

10. InstanceRetrieved Class Data Structure

| Attribute | Type |
|---|---|
| User* | CHAR[30] |
| Database* | CHAR[30] |
| Class* | CHAR[30] |
| Key* | CHAR[3000] |

11. Join Class Data Structure

| Attribute | Type |
|---|---|
| Database* | CHAR[30] |
| Class* | CHAR[30] |
| PointerDatabase* | CHAR[30] |
| PointerClass* | CHAR[30] |
| Occurrence* | LONGINT |
| JoinDatabase | CHAR[30] |
| JoinClass | CHAR[30] |

12. Relation Class Data Structure

| Attribute | Type |
|---|---|
| Relation* | CHAR[3] |

13. Relationship Class Data Structure

| Attribute | Type |
|---|---|
| Database* | CHAR[30] |
| Class* | CHAR[30] |
| PointerDatabase* | CHAR[30] |
| PointerClass* | CHAR[30] |
| Occurrence* | LONGINT |
| Attribute | CHAR[30] |
| PointerAttribute | CHAR[30] |
| Relation | CHAR[3] |
| Description | CHAR[300] |

14. SelectInstance Class Data Structure

| Attribute | Type |
|---|---|
| User* | CHAR[30] |
| Database* | CHAR[30] |
| Class* | CHAR[30] |
| Key* | CHAR[3000] |
| Select | LONGINT |
| Sequence | LONGINT |

15. SelectSource Class Data Structure

| Attribute | Type |
|---|---|
| Database* | CHAR[30] |
| Class* | CHAR[30] |
| Attribute* | CHAR[30] |
| Number | LONGINT |
| CreateDate | DATE |

16. SelectStatus Class Data Structure

| Attribute | Type |
|---|---|
| User* | CHAR[30] |
| Database* | CHAR[30] |
| Class* | CHAR[30] |
| Select | LONGINT |
| DateSelected | DATE |
| TimeSelected | TIME |
| LastInstance | CHAR[3000] |
| NumberSelected | LONGINT |

17. SelectVersion Class Data Structure

| Attribute | Type |
|---|---|
| User* | CHAR[30] |
| Select | LONGINT |

18. Validation Class Data Structure

| Attribute | Type |
|---|---|
| Database* | CHAR[30] |
| Class* | CHAR[30] |
| Attribute* | CHAR[30] |
| Validation | CHAR[3000] |
| Description | CHAR[300] |

19. ValidationPointer Class Data Structure

| Attribute | Type |
|---|---|
| Database* | CHAR[30] |
| Class* | CHAR[30] |
| Attribute* | CHAR[30] |
| Occurrence* | LONGINT |
| PointerDatabase | CHAR[30] |
| PointerClass | CHAR[30] |
| PointerAttribute | CHAR[30] |

Procedures

The procedures include:

1. Cascade.Process (When a user updates a class (a "first level" update), that update may require other related classes to be automatically updated ("second level" updates). The Cascade.Update procedure ensures that these second level updates occur. Cascade.Process selects all instances in the Cascade class, and executes Cascade.Update for each one of those instances to carry out these second level updates.)

2. Cascade.Update (Carries out the second level updates. Second level updates are updates that are not being made by a user. Cascade.Update is passed the name of a database and a class, and passed the details of an instance within that class, that has been updated. Cascade.Update selects all instance in the CalculationPointer class that reference that database and class. Cascade.Udpate uses Select.Set to set a current select, and then for every database and class selected from CalculationPointer, uses Select.Activate to extend the select to that database and class. It then uses Select.Get to retrieve all instances in that database and class that are related to the instance that was updated. It then uses Instance.Get to retrieve each related instance, and uses Instance.Update to update each instance back into the database and class. Instance.Update automatically recalculates every instance that it updates. This ensures that data integrity is maintained within all databases without requiring custom written programs to do so.)

3. Class.ClearPointer (Closes all pointers to a particular class. Class.ClearPointer is used by InfoBase.Create prior to deleting a class. This is only required if the language a particular embodiment of the invention is being written in requires pointers to databases and classes, and does not allow classes that are currently pointed to to be deleted.)

4. Class.SetPointer (Sets up a pointer to a particular class. This is used by most procedures in an embodiment of the invention. It is only required if the language the particular embodiment of the invention is being written in requires pointers to databases and classes.)

5. Clean.Process (The Select . . . Processes listed below, eg. Select.Activate, create temporary instances in the Select . . . classes. The instances are used to control and track search results. These temporary instances can be deleted once the user has exited the system. This procedure cleans out those classes. The date and time each instance was written into each class is stored on the instance. Clean.Process selects all instances with a date and time older than, say, two hours ago, and then deletes those instances. This is usually required for performance reasons.)

6. Edit (Allows the various other procedures to be tested and tialed. Edit is optional, but is useful for testing separate procedures when developing a particular embodiment of the invention. Edit lists all databases in the Database class, and allows the user to select one. It then lists all classes in the Class class for that database, and allows the user to select one. It then allows the user to search through that class in that database, and to view, edit, create or delete instances in that class. It uses the other procedures defined within this document to actually carry out the searching, retrieving, updating and deleting, thereby allowing the procedures to be tested individually.)

7. ErrorLog.Put (If something goes wrong with the control data or procedures, this procedure handles the error, and records it in such a way that a system administrator can find out what the error was and take the appropriate action. It writes the errors onto the ErrorLog class, to be retrieved at a later time by the system administrator. Any procedure that encounters an error will use ErrorLog.Put to record the error, and will then exit, returning a flag warning that an error has occurred.)

8. Expression.Evaluate (Every attribute in every class in every database can have a validation expression or a calculation expression with which it is associated. The validation expression determines whether the value of the attribute is valid. The calculation expression determines what the value should be of that attribute. It can include literals, text or attributes from any class and database, and functions, operations and statements. Expression.Evaluate is similar to a compiler or to a calculator, in that it parses each calculation, performing all functions as required, and returns the results of the calculation. The database, class and instance for which the calculation is being performed is passed into Expression.Evaluate. If Expression.Evaluate finds an Attribute reference within the calculation, and the Attribute is within the current database and class, it replaces the Attribute with the value of that attribute from the relevant instance (the instance that was passed in). If it finds an Attribute that is within a different database and class, it uses Select.Set to activate the relevant instance in the database and the relevant class. It then uses SelectActivate to activate all instances in the different database and class that are related to the relevant instance. It then uses Select.Get to retrieve a list of the related instances, and Instance.Get to retrieve each one of those instances. If the attribute being referred to is numeric, it adds up the values of that attribute in all the related instances. If the attribute being referred to is not numeric, it concatenates the values of that attribute in all the related instances. It then replaces that Attribute reference in the calculation with the added or concatenated values.)

9. InfoBase.Create (Takes the definition created when defining an information system, sets up the databases, classes and attributes defined in the definition, and loads all the control classes with the necessary information to make it all work. The reader is further referred to the control class definitions.)

10. Instance.Calculate (When an instance is being written to a class, this procedure uses the Expression.Evaluate procedure to evaluate the value of any calculated attributes. It selects all instances in the calculation class that refer to the database and class that the instance is being written to. It then calls Expression.Evaluate for every calculation instance, and replaces the value of the attribute that each calculation instance refers to with the value returned by Expression.Evaluate.)

11. Instance.Get (Gets an instance from a database and class.)

12. Instance.Lock (Locks a particular instance within a database and class, to ensure that it can only be used by one user or procedure at any one time. If the instance is already locked by someone else, it returns a warning that the instance is locked. Other procedures that use this instance handle the warning appropriately. Locking is required to ensure that data is not inadvertently lost if more than one user attempts to update the same instance at the same time.)

13. Instance.Update (Adds an instance, updates an existing instance, or deletes an instance. Uses the Instance.Calculate procedure to calculate attributes. Uses the Instance.Validate procedure to ensure that the instance being added or updated is valid, and also to ensure that adding, updating or deleting the instance will not cause any other instances to become invalid. Uses Instance.Lock to lock the instance, and checks that no one else has updated the instance since this user retrieved the instance. If someone has updated the instance since this user retrieved it, an error is returned, and the instance is not updated, hereby preventing the accidental overwriting of data. Uses either Cascade.Update or Cascade.Process to carry out all second level updates. It uses Cascade.Update if the second level updates are to be carried out immediately on line, or Cascade.Process if the second level updates are to be carried out in background mode.)

14. Instance.Validate (Ensures that the instance is valid. Tests for relational integrity using the various Select procedures, and tests for informational integrity using Expression.Evaluate. Instance.Validate operates in a very similar manner to Instance.Calculate, except that it uses the Validation class instead of the calculation class, and instead of setting the values of attributes in the instance being validated with the results of Expression.Evaluate, if Expression.Evaluate returns a value of blank or 0 for any attribute in the instance, that attribute has failed validation.)

15. Select.Activate (Select processes can be thought of as filters on particular databases and classes. Only the instances included in the current select can be seen. Select processes start with Select.Alter, which selects the instances within a particular database and class. Select processes can be extended over many databases and classes, using Select.Activate. Select.Activate uses Select.Extend to achieve each step of this. It begins by retrieving the current select version from SelectVersion. It then selects all classes that have that select version from SelectStatus. It then finds which of those classes is closest to the database and class being activated, by processing through the Join class and finding the shortest number of links. It then uses Select.Extend to extend the select each step of the way, as defined within the Join class.)

16. Select.Alter (Used to alter or create a current select. It is passed a database and class, a list of attributes on that database and class, a list of relationships, and a list of search data. Select.Alter uses Select.Search to return a list of instances on the given database and class that conform to the search data passed. It is also passed a select type. If the select type is New, it uses Select Set to set the list of instances as the current selected list of instances. If the select type is Expand, it adds the list of instances into the currently selected list of instances. If the select was a Shrink, it fins all instances that were selected previously and also exist in the list of instances, and sets only those instances as the currently selected set of instances. It uses Select.Set to actually set the list of instances as the currently selected set.)

17. Select.Extend (Used by Select.Activate to extend a select from one database and class to a neighbouring database and class. Select.Extend uses the Relationship class to determine what attributes in one class are related to what attributes in the other class. It then performs a Join operation on the two classes, but only for the instance that were currently activated in the database and class being extended from.)

18. Select.Get (Returns a list of all instances currently selected in a particular database and class. Used by other procedures. It retrieves the current select version from SelectVersion, and then retrieves all instances for the database and class with that select version from the SelectInstance class. It builds a list of instances from the Key attribute from the SelectInstance class, and returns that list.)

19. Select.Search (Used by Select.Alter to actually search the database and class for all instances that conform to the given rules. It is passed a database, a class, a list of instances, a list of relationships, and a list of search values. It selects all instances from that database and class where the attributes conform to the relationships and search values, and returns a list of those instances.)

20. Select.Set (Takes a list of instances, and sets the current select for a given database, class and user combination. Used by other procedures such as Select.Alter and Select.Extend. For each instances in the current select, it creates an instance in the SelectInstance class, setting the select version to the new or current select version.)

21. User.New (Creates a new unique user number. Used internally by other routines. May not be required by some languages, or in some embodiments of the invention.)

Externally Accessible Procedures

The following procedures can be accessed directly from other external programs. This allows a software embodiment of the present invention to be used by other information systems or programs. This enables information that is not in an electronic format to be rendered into an electronic format and passed into a software embodiment of the present invention, and enables information in an electronic format in a software embodiment of the present invention to be output in non electronic formats.

1. Cascade.Process (When an instance is added, updated or deleted using Instance.Update, one of the options determines whether second level updates should be carried out immediately and on line, or in background mode, or be carried out at a later, undefined time. If a later, undefined time is chosen, Cascade.Process can be executed to carry out those second level updates.)
2. Clean.Process (This should be run as part of housekeeping, to clean unneeded instances out of control tables.)
3. InfoBase.Create (Once a definition has been created, it can be loaded into the control tables via this routine.)
4. Instance.Get (s used to retrieve an instance from the database.)
5. Instance.Update (Is used to add an instance, update an existing instance, or delete an instance. It can carry out all validation, and if the instance fails validation, inform a user why. It may also ensure that all second level updates occur. One of the options determines whether second level updates should be carried out immediately and on line, or in background mode, or be carried out at a later, undefined time. If a later, undefined time is chosen, Cascade.Process will need to be executed to carry out those second level updates.)
6. Select.Activate (If a user already has a current select, and they want to extend that select to any other database and class, Select.Activate is used.)
7. Select.Alter (Used to alter or create a current select.)
8. Select.Get (If a user desires to know what instances are selected in a particular database and class, Select.Get is used. The user should use either Select.Alter or Select.Activate first to make sure there is a valid current selection for the database and class. If there is no valid current selection, Select.Get simply returns a blank list.)

II. Further Examples

The following examples provide a more detailed outline of one embodiment of the present invention. These examples are intended to be merely illustrative and not limiting of the scope of the present invention.

The following details are broadly grouped by categories and aspects of these categories then identified. Use of the indicia, for example <= or ==>, should be appreciated by the reader to be an arbitrary, although reminiscent, use. It is quite feasible to substitute other indicia as a label for the underlying functionality.

1 Extended Relational Integrity 1.1. Valid relationship categories are <, <=,=, =>, >, and <>.
1.2. Valid relationship types are <<, <, <<=, <=, <==, =, ==>, =>, =>>, >, >>, <<>, <>> and <>.
1.3. The relationship types (defined in 1.2) are related to the relationship categories (defined in 1.1) according to the following sets. The items within each pair of brackets form one set. The first item in each set is the relationship category, and the remaining items in each set are the related relationship types. (<, << and <), (<=, <<=, <=, <==), (=, =), (=>, ==>, =>, =>>), (>, >, >>), and (<>, <<>, <>>, <>).
1.4. Any attribute can be related to any other attribute with any one of the relationship types (defined in 1.2).
1.5. In any relationship (defined in 1.4), one attribute is the child attribute, and the other attribute is the parent attribute.
1.6. The data in any child attribute (defined in 1.5) is only valid if it is related to data in the parent attribute by the defined relationship category (defined in 1.1, 1.2 and 1.3).
1.7. The data in the parent attribute (defined in 1.5) is valid unless altering data in the parent attribute would cause data in the child attribute to be invalid (defined in 1.5 and 1.6).
1.8. An instance is only valid if all child and parent attributes are valid (defined in 1.6 and 1.7).
1.9. An instance is only stored in a class if the instance is valid (defined in 1.8).

2. Related Instances 2.1. Relationship types <, <=, =, =>, > and <> are multiple instance relationship types.
2.2. Relationship types <<, <<=, <==, ==>, =>>, >>, <<> and <>> are single instance relationship types.
2.3. Any class with a child attribute is a child class.
2.4. Any class with a parent attribute is a parent class.
2.5. Any class can be neither, either, or both, a child class and a parent class.
2.6. A primary instance is tentatively related to all secondary instances in one class where the relationship between the data in the attributes of the primary instance and the data in the attributes of the secondary instances conform to the relationship types for those attributes.
2.7. When all related attributes between two classes are related with multiple instance relationship types, an instance in either class can have multiple related instances in the other class, and all tentatively related instances are confirmed related instances.
2.8. When one or more related attributes between two classes are related with single instance relationship types, an instance in the child class will only have one single related instance in the parent class, only one of the tentatively related instances will be a confirmed related instance, and it will be chosen according to which single instance relationship type is used.
2.9. When one or more related attributes between two classes are related with single instance relationship types, an instance in the parent class can have multiple instances in the child class.
2.10. When one or more related attributes between two classes are related with single instance relationship types, only one of the tentatively related parent instances will be confirmed related to the child instance, and it will be chosen according to which single instance relationship type is used. An instance in the parent class is related to all instances in the child class that are related to the parent instance.
2.11. Which tentatively related instance will become a confirmed related instance is chosen according to the rule: when the single instance relationship type <<, <<=, ==> or <<>, choose the matching parent instance with the least value in the related attribute, and when the single instance relationship type is <==, =>>, >> or <>>, choose the matching parent instance with the greatest value in the related attribute.

2.12. A primary instance is indirectly related to all secondary instances in one class where the secondary instances are not confirmed related to the primary instance (defined in 2.1), but the secondary instances are confirmed related (defined in 2.1) to other instances which are either confirmed or indirectly related to the primary instance.

2.13. All instances that are either confirmed related or indirectly related are related.

3. Calculations 3.1. A calculation is related to an attribute of a class.

3.2. A calculation can contain a combination of literals, references, functions, operations and statements.

3.3. Literals are literal values, such as text or numbers, and are optionally surrounded by quotes.

3.4. References are references to attributes, either in the format "attribute" or "database.class.attribute".

3.5. When a reference is in the format "attribute", it refers to the value of that attribute in the instance that the calculation is being carried out for.

3.6. When a reference is in the format "database.class.attribute", it refers to the accumulated value of "attribute" of all instances in "database.class" that are related to the instance that the calculation is being carried out for.

3.7. Functions are in the format "functionname(value)", and return the result of value after the function has been carried out.

3.8. Operations are in the format "value1 operation value2", and return the result of value1 after operated on by value2.

3.9. Statements are in the format "statement1 (value1) statement2 (value2) [statement3 (value3)] etc, and return the value of value2, value3, value4, etc. Which value they return is dependant on value1.

3.10. "value", "value1", "value2", "value3", etc can be any combination of literals, references, functions, operations or statements.

4. Informational Integrity 4.1 Information integer consists of an informational calculation attached to each attribute to be automatically updated to be kept in integrity.

4.2 When an instance is about to be written, the every attribute of that instance that has an informational calculation has the calculation worked out.

4.3 When the calculation is worked out, the resulting value is placed in the attribute of the instance.

4.4 The instance is only written once all attributes with an informational calculation have been calculated and updated.

5. Calculated Validation 5.1. Calculated validation consists of a validation calculation attached to each attribute to be automatically validated.

5.2. When an instance is about to be written, every attribute of that instance that has a validation calculation has the calculation worked out.

5.3. If the value returned from the calculation is not a particular value or does not fall within a particular range of values, the attribute value is valid.

5.4. If the value returned from the calculation is a particular value or falls within a particular range of values, the attribute value is invalid.

5.5. If any attribute values are invalid, the instance is not written.

6. Searching and Selects, Drill Down, Up and Sideways 6.1. Search results are stored in a controlling class for as long as the user that requested the search remains logged in, and until the user carries out a subsequent search.

6.2. There are three different kinds of searches; New, Expand and Shrink.

6.3. A New search ignores the results of the previous search and only returns the results that fit the current search parameters.

6.4. An Expand search adds the results of the current search parameters onto the results of the previous search.

6.5. A Shrink search only includes the intersection of the current search parameter results and the previous search results. That is, instances are only included if they were included in both the previous and the current search results.

6.6. If requested, the search results can be extended beyond the class(instances) search by identifying related instances in the classes the results are to be extended to, and including those related instances in the stored results of the current search.

References to the terms connecting, communicating, transmitting, requesting, receiving, exchanging and the like, and permutations thereof, should be taken to broadly pertain to the transfer of information or data.

Thus, there has been provided in accordance with the present invention, an improved method of and new computer software for designing, developing and/or maintaining customised information systems which satisfies the advantages set forth above:

The invention may also be said broadly to consist in the parts, elements and features referred to or indicated in the specification of the application, individually or collectively, in any or ah combinations of two or more of said parts, elements or features, and where specific integers are mentioned herein which have known equivalents in the art to which the invention relates, such known equivalents are deemed to be incorporated herein as if individually set forth.

Although the preferred embodiment has been described in detail, it should be understood that various changes, substitutions, and alterations can be made herein by one of ordinary skill in the art without departing from the scope of the present invention as hereinbefore described and as hereinafter claimed.

The invention claimed is:

1. A method of providing a Spread of Activation, the Spread of Activation used for determining at least one instance in a second class in a customised information system which is related to at least one selected instance in a first class in the customised information system, the method including the steps of:

(1) retrieving a pre-defined pathway between the first class and the second class from a join class, wherein the pre-defined pathway retrieved from the join class includes a list, the list including a first class name, being a name of the first class, and a second class name, being a name of the second class;

(2) activating the at least one selected instance in the first class to provide an active instance, wherein activating the at least one selected instance is achieved by creating a first temporary instance in a select instance class, and wherein the first temporary instance includes the first class name and a first key for the active instance;

(3) using a first relationship rule, from a relationship class, associated with both the first class and a next class in the pathway, to create and execute a first database query used to identify a related instance associated with the next class, whereby the first class name and a next class name, being a name of the next class, are obtained from the list, and the next class not being the second class;

(4) activating the related instance in the next class by creating a temporary instance in the select instance class to set the related instance as a new active instance, and wherein the temporary instance includes a key for the new active instance;

(5) using a relationship rule, from the relationship class, associated with both the next class and a further next class in the pathway, to create and execute a database query used to identify a further related instance, associated with the further next class, related to the new active instance;

(6) activating the further related instance in the further next class by creating a new temporary instance in the select instance class to set the further related instance as the new active instance, and wherein the new temporary instance includes a key for the new active instance;

(7) setting:
  (A) the new temporary instance as the temporary instance;
  (B) the key for the new active instance as the key for the active instance; and,
  (C) the further next class as the next class; and, (8) repeating steps (5), (6) and (7) until the further next class is the second class or no further related instances are identified;

wherein for an iteration of step (5):
  (A) the next class name and the further next class name, being a name of the further next class, are obtained from the list and the next class and the further next class have a relationship defined within an instance in the relationship class;
  (B) the instance in the relationship class includes at least the next class name, a next class attribute within in the next class, the further next class name, a further next class attribute within the further next class, and the relationship rule;
  (C) the relationship rule is selected from the group consisting of < (less than), <= (less than or equal to), = (equal), >= (greater than or equal to), > (greater than), and <> (not equal);
  (D) the instance in the relationship class defines that a plurality of next class values, within the next class attribute and within a plurality of instances within the next class, are related to a plurality of further next class values, within the further next class attribute and within a plurality of instances within the further next class, according to the relationship rule; and,
  (E) the database query identifies the further related instance, by selecting an instance from the plurality of instances within the further next class, and where a value from the plurality of further next class values within the further next class attribute matches a search value according to the relationship rule, the search value obtained from the next class attribute of the new active instance from the next class, and the new active instance from the next class is determined from the temporary instance.

2. The method according to claim 1, wherein more than one related instances are identified in the next class in the pathway.

3. A method of providing a retrieve function, utilising the method according to claim 1, the retrieve function returning a value of an attribute in the second class related to an instance in the first class, the method including the steps of:
  (1) using the Spread of Activation to determine at least one instance in the second class which is related to the selected instance in the first class; and,
  (2) obtaining the value of the attribute corresponding to the new active instance in the second class.

4. A method of providing a retrieve function, utilising the method according to claim 1, the retrieve function returning a value of an attribute in the second class related to an instance in the first class, the method including the steps of:
  (1) using the Spread of Activation to determine at least one instance in the second class which is related to the selected instance in the first class;
  (2) setting a result value to null;
  (3) for the new active instance in the second class:
    (A) obtaining the value of the attribute for the new active instance in the second class;
    (B) if the value of the attribute and the result value are both numeric, adding the value of the attribute to the result value; and,
    (C) if the value of the attribute and the result value are not both numeric, concatenating the value of the attribute to the result value; and,
  (4) returning the result value.

5. A method of providing a calculation function, utilising the retrieve function according to claim 3, the calculation function being attached to an attribute in the first class and used to derive the value of the attribute in the first class from at least one of the group consisting of related attributes in the second class, and one or more absolute values.

6. A method of providing a derivation function, using the calculation function according to claim 5, the derivation function being attached to an attribute in the first class, whereby the calculation function is performed each time any instance is created or updated in the first class containing the attribute.

7. The method according to claim 5, wherein the calculation function provides a validation function.

8. The method according to claim 7, wherein the validation function is attached to an attribute in the first class and additionally:
  (1) the calculation function is performed each time any instance including the attribute in the first class is created or updated;
  (2) if the result of all the calculations for that class for that instance is true, then the instance is valid and is stored in the first class; and,
  (3) if the result of one or more of the calculations is false, then the instance is invalid, and is not stored in the first class.

9. A method of providing data integrity when creating, updating or deleting an instance in a first class, utilising the method according to claim 1.

10. A method of providing data integrity, utilising the method according to claim 6, wherein the method of providing data integrity includes the steps of:
  (1) selecting an instance in a CalculationPointer class which refers to the first class;
  (2) identifying a class pointed to by the instance in the CalculationPointer class, the identified class being the second class;
  (3) performing the Spread of Activation from the selected instance in the first class to the new active instance in the second class; and,
  (4) for the at least one activated instance in the second class:
    (A) retrieving the at least one instance from the second class; and,
    (B) updating the at least one instance in the second class.

11. A method of providing a drill down function, utilising the method according to claim 1, the method including the steps of:
(1) selecting one or more instances in the first class which satisfy selected criteria;
(2) selecting the second class; and,
(3) performing the Spread of Activation from each selected instance in the first class to the selected second class.

12. The method as claimed in claim 11, wherein a further drill down function can be performed from the resulting activated instances in the second class.

13. The method as claimed in claim 12, wherein the further drill down function is performed on an AND, OR or NOT basis relative to the initial drill down function.

14. The method as claimed in claim 1, wherein activating the at least one selected instance in the first class is effected by creating an instance in a SelectStatus class for the first class.

15. The method as claimed in claim 1, wherein all instances in the first class are activated.

16. The method as claimed in claim 1, wherein activating more than one instances in the first class is effected by creating an instance in a SelectInstance class for each of the more than one instances in the first class.

17. The method as claimed in claim 1, wherein the pre-defined pathway is the shortest pathway between the first class and the second class.

18. The method as claimed in claim 1, wherein related instances in the next class are activated by creating an instance in a SelectInstance class for the related instances in the next class.

19. The method as claimed in claim 1, wherein activating an instance in the next class is effected by creating an instance in a SelectStatus class for the next class.

20. A system for providing a Spread of Activation, the Spread of Activation used for determining at least one instance in a second class in a customised information system which is related to at least one selected instance in a first class in the customised information system, the system including:
a database to store a join class and a relationship class; and,
at least one processor adapted to:
(1) retrieve a pre-defined pathway between the first class and the second class from the join class, wherein the pre-defined pathway retrieved from the join class includes a list, the list including a first class name, being a name of the first class, and a second class name, being a name of the second class;
(2) activate the at least one selected instance in the first class to provide an active instance, wherein activating the at least one selected instance is achieved by creating a first temporary instance in a select instance class, and wherein the first temporary instance includes the first class name and a first key for the active instance;
(3) use a first relationship rule, from the relationship class, associated with both the first class and a next class in the pathway, to create and execute a first database query used to identify a related instance associated with the next class, whereby the first class name and a next class name, being a name of the next class, are obtained from the list, and the next class not being the second class;
(4) activate the related instance in the next class by creating a temporary instance in the select instance class to set the related instance as a new active instance, and wherein the temporary instance includes a key for the new active instance;
(5) use a relationship rule, from the relationship class, associated with both the next class and a further next class in the pathway, to create and execute a database query used to identify a further related instance, associated with the further next class, related to the new active instance;
(6) activate the further related instance in the further next class by creating a new temporary instance in the select instance class to set the further related instance as the new active instance, and wherein the new temporary instance includes a key for the new active instance;
(7) set:
(A) the new temporary instance as the temporary instance;
(B) the key for the new active instance as the key for the active instance; and,
(C) the further next class as the next class; and,
(8) repeat steps (5), (6) and (7) until the further next class is the second class or no further related instances are identified;
wherein for an iteration of step (5):
(A) the next class name and the further next class name, being a name of the further next class, are obtained from the list and the next class and the further next class have a relationship defined within an instance in the relationship class;
(B) the instance in the relationship class includes at least the next class name, a next class attribute within in the next class, the further next class name, a further next class attribute within the further next class, and the relationship rule;
(C) the relationship rule is selected from the group consisting of < (less than), <= (less than or equal to), = (equal), >= (greater than or equal to), > (greater than), and <≦ (not equal);
(D) the instance in the relationship class defines that a plurality of next class values, within the next class attribute and within a plurality of instances within the next class, are related to a plurality of further next class values, within the further next class attribute and within a plurality of instances within the further next class, according to the relationship rule; and,
(E) the database query identifies the further related instance, by selecting an instance from the plurality of instances within the further next class, and where a value from the plurality of further next class values within the further next class attribute matches a search value according to the relationship rule, the search value obtained from the next class attribute of the new active instance from the next class, and the new active instance from the next class is determined from the temporary instance.

21. A computer readable medium of instructions for providing a Spread of Activation, the Spread of Activation used for determining at least one instance in a second class in a customised information system which is related to at least one selected instance in a first class in the customised information system, the computer readable medium of instructions adapted to:
(1) retrieve a pre-defined pathway between the first class and the second class from the join class, wherein the pre-defined pathway retrieved from the join class includes a list, the list including a first class name, being a name of the first class, and a second class name, being a name of the second class;

(2) activate the at least one selected instance in the first class to provide an active instance, wherein activating the at least one selected instance is achieved by creating a first temporary instance in a select instance class, and wherein the first temporary instance includes the first class name and a first key for the active instance;

(3) use a first relationship rule, from the relationship class, associated with both the first class and a next class in the pathway, to create and execute a first database query used to identify a related instance associated with the next class, whereby the first class name and a next class name, being a name of the next class, are obtained from the list, and the next class not being the second class;

(4) activate the related instance in the next class by creating a temporary instance in the select instance class to set the related instance as a new active instance, and wherein the temporary instance includes a key for the new active instance;

(5) use a relationship rule, from the relationship class, associated with both the next class and a further next class in the pathway, to create and execute a database query used to identify a further related instance, associated with the further next class, related to the new active instance;

(6) activate the further related instance in the further next class by creating a new temporary instance in the select instance class to set the further related instance as the new active instance, and wherein the new temporary instance includes a key for the new active instance;

(7) set:
  (A) the new temporary instance as the temporary instance;
  (B) the key for the new active instance as the key for the active instance; and,
  (C) the further next class as the next class; and, (8) repeat steps (5), (6) and (7) until the further next class is the second class or no further related instances are identified;

wherein for an iteration of step (5):
  (A) the next class name and the further next class name, being a name of the further next class, are obtained from the list and the next class and the further next class have a relationship defined within an instance in the relationship class;
  (B) the instance in the relationship class includes at least the next class name, a next class attribute within in the next class, the further next class name, a further next class attribute within the further next class, and the relationship rule;
  (C) the relationship rule is selected from the group consisting of <(less than), <=(less than or equal to), =(equal), >=(greater than or equal to), > (greater than), and <> (not equal);
  (D) the instance in the relationship class defines that a plurality of next class values, within the next class attribute and within a plurality of instances within the next class, are related to a plurality of further next class values, within the further next class attribute and within a plurality of instances within the further next class, according to the relationship rule; and,
  (E) the database query identifies the further related instance, by selecting an instance from the plurality of instances within the further next class, and where a value from the plurality of further next class values within the further next class attribute matches a search value according to the relationship rule, the search value obtained from the next class attribute of the new active instance from the next class, and the new active instance from the next class is determined from the temporary instance.

22. The computer readable medium of instructions as claimed in claim 21, wherein the computer readable medium of instructions are part of a software development tool which assists a user to develop or maintain the customised information system.

* * * * *

UNITED STATES PATENT AND TRADEMARK OFFICE
CERTIFICATE OF CORRECTION

PATENT NO. : 7,383,249 B2  Page 1 of 1
APPLICATION NO. : 10/473009
DATED : June 3, 2008
INVENTOR(S) : Glenn John Groves It is certified that error appears in the above-identified patent and that said Letters Patent is hereby corrected as shown below:

Title Page, Item 73, should read:

--Assignee: The Future is Freedom Pty Ltd.,
Harris Park (AU)--

Signed and Sealed this

Twenty-sixth Day of August, 2008

JON W. DUDAS
*Director of the United States Patent and Trademark Office*